United States Patent Office 3,379,664
Patented Apr. 23, 1968

3,379,664
AQUEOUS DISPERSIONS OF POLYMERIC MATERIALS
Ralph M. Wiley, Midland, Mich., assignor to The Dow Chemical Company, Midland, Mich., a corporation of Delaware
No Drawing. Filed Apr. 20, 1964, Ser. No. 361,238
9 Claims. (Cl. 260—28.5)

This invention relates to an aqueous dispersion of polymeric material. More particularly it concerns aqueous dispersions of spherical or nearly spherical polymeric particles having an average size of from about 0.2 to about 40 microns, i.e. microspheres, and especially such dispersions which do not settle or cream to a significant extent upon standing.

The term "microspheres," wherever used in this specification, refers to particles, especially within the above size ranges, which ideally are perfect spheres but includes particles which are nearly spherical in shape, e.g. particles having a predominantly curved outline generally convex in shape.

A great deal of art has developed relating to methods of preparation of stable colloidal dispersions of polymeric material, commonly called latexes or latices. However, latexes usually are comprised of particles having smaller average diameters than the microspheres of this invention. When aqueous dispersions of larger-sized particles such as particles having an average diameter greater than 0.2 micron and especially when greater than 0.8 micron are prepared, special treatment is required to keep the particles uniformly dispersed, i.e. to prevent settling or creaming of the particles, when agitation is not continued.

Polymeric materials produced by usual suspension polymerization techniques normally remain somewhat uniformly dispersed only during agitation, or stirring, of the dispersion and the particles are of larger size such as up to 5 mm. or greater. By a procedure which has been called "dispersion polymerization" (C. E. Schildkneckt, "Polymer Processes," Interscience Publishers, Inc., New York, 1956, p. 105) aqueous suspensions of certain polymers have been prepared which have a particle size of from about 0.5 micron to about 10 microns. Such suspensions are stabilized by much higher concentrations of water-soluble polymers than used in suspension polymerization. A common and usual method of maintaining the dispersion of polymeric particles in aqueous media, e.g. large particle-size latexes and suspensions of even larger particle sizes such as produced by dispersion polymerization or by suspension polymerization, is to add an agent which hinders coalescence of the droplets and a thickener and/or protective colloidal such as methyl cellulose, gelatin, polymethacrylamide, polyvinyl alcohol and salts of polymeric carboxylic acids, e.g. polyacrylic acid and polymethacrylic acid. However, in compositions for deposition of microspheres on slip-deficient films, the use of such a thickener in quantities required for stability in the quiescent state is both impractical and undesirable since the thickener hinders the rolling of the microspheres or "ball bearings" and thus interferes with the action of the microspheres in improving the slip of the film. Similarly, for other applications where high viscosity is disadvantageous or where minimizing the amounts of added materials is required, the use of large quantities of thickeners is undesirable.

Therefore, it is an object of this invention to provide an aqueous dispersion of polymeric material comprising approximately spherical particles having an average diameter greater than about 0.8 micron and especially in the range of from about 3 microns to about 40 microns in which dispersion the particles do not settle or cream upon prolonged storage.

Other objects will be apparent in the following description of the invention.

It has been discovered, and this discovery is the subject of the present invention, that aqueous dispersion of polymeric materials having improved properties can be obtained by polymerizing in aqueous dispersion under certain conditions a monomer-containing composition comprising styrene or ring-substituted-methylstyrenes which have certain proportions of a solid, low-density hydrocarbon substance dissolved therein, said proportions being selected such that the resulting polymeric particles have approximately the same density as the aqueous portion of the composition, i.e., a specific gravity of about 1.00. Such aqueous compositions are stable for long periods of time without creaming or settling of the polymeric microspheres which have an average diameter of from about 3 microns to about 40 microns, and are non-water sensitive.

The solid, low density hydrocarbon substances used in the practice of this invention are the waxes which have a specific gravity of less than about 0.95 and which consist essentially of higher hydrocarbons. The waxes having such characteristics and thus which are operable in this invention include the mineral waxes, such as paraffin wax, microcrystalline wax, petrolatum wax, ozokerite and ceresin, and the synthetic polyolefins having similar characteristics, e.g. the polyethylene waxes. Such waxes are used in an amount from about 15 percent to about 35 percent by weight based on the total weight of monomers and the wax dissolved therein. When less than about 15 percent by weight of the low-density hydrocarbon substances are used the density of the composition is not reduced sufficiently to obtain the advantages of this invention and when more than about 35 percent by weight is used, uniformity of composition is difficult to maintain, and the properties of the resulting product do not conform to the objects of this invention.

The monomers in which the hydrocarbon substances are dissolved and which are polymerized to form the aqueous dispersions of this invention are styrene, vinyl toluene and other methyl ring-substituted styrenes such as 2,4-dimethylstyrene, 2,5-dimethylstyrene, and 3,4-dimethylstyrene. Such monomers are represented by the formula

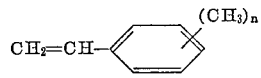

where $n$ is a cardinal number from 0 to 2. Often it is preferred, but not required, to add a small quantity of a difunctional monomer such as divinylbenzene. Other ethylenic hydrocarbon monomers polymerizable under emulsion polymerization conditions may be added if desired in minor amounts, i.e. less than about 20 percent by weight of the polymerizable constituents. Such other polymerizable monomers are represented by, but not limited to, butadiene, α-methylstyrene, divinylbenzene, and isoprene.

To prepare the improved aqueous dispersions of this invention, a solid, low-density hydrocarbon substance hereinbefore described is dissolved in a vinyl-aromatic monomer such as styrene and ring-substituted-methylstyrenes, by stirring and optionally with heating, then polymerization may be carried out by using the modified colloidal silica and added ingredients as described in my Canadian Patent 656,447 (incorporated herein by reference) to form oil-in-water emulsions in which the monomeric constituents are polymerized by free-radical catalysis, for example as described in Examples 1–14 of the above-cited Canadian patent. Temperatures and catalysts are selected as in ordinary free-radical polymerization in aqueous media. Numerous other additives customarily or occasionally employed in polymerization processes in aqueous media also may be used, if desired, such as water-phase polymerization inhibitors, pH controlling agents, e.g. acids, bases, and buffers, and the like. Similarly, after polymerization, surfactants, antioxidants, pH control agents, bactericides, antistatic agents, and other agents commonly used in water dispersions may be added.

The aqueous dispersion of polymeric material thus obtained comprises microspheres having an average diameter of from about 3 to about 40 microns which are stable during long periods of storage, i.e. settling or creaming of the polymeric microspheres does not occur even without periodic stirring during storage for two months or longer.

The following examples are given to illustrate more fully, to those skilled in the art, the practice of this invention but are not intended as providing any limitations in scope. In the examples, all parts and percentages are by weight unless otherwise indicated.

Examples

A solution was prepared from 115 pounds of type I paraffin wax and 410 pounds of vinyl toluene by stirring and by heating at 60° C. for a few minutes. The resulting solution was cooled to 45° C., then 22 pounds of 53 percent active divinyl benzene and 600 grams of benzoyl peroxide were added. After the benzoyl peroxide had dissolved, the resulting oily solution was added to an agitated aqueous solution which had previously been prepared by mixing 77 gallons of water, 77.5 pounds of a 30 percent solution of a colloidal silica having an average particle size of about 20 millimicrons, and 590 grams of water-soluble protein ("Difco Bacto-Peptone") dissolved in 5 pounds of water. By this procedure there resulted a coarse emulsion, the pH of which was adjusted to 4.0 by the addition of hydrochloric acid. Then the emulsion was agitated at 110 r.p.m. for a few minutes in a 200 gallon kettle, passed through a homogenizer at a pressure of 5,000 p.s.i., and returned to the kettle. The resulting homogenized emulsion was agitated at 50 r.pm. and heated at 85° C. for 15 hours causing the monomeric constituents to undergo polymerization. After the product obtained thereby was cooled to 30° C., a solution of 14 pounds of technical sodium lauryl sulfate in 100 pounds of water was added, and the resulting composition was passed through cheese cloth to remove a small amount of coarse particles. The aqueous dispersion obtained thereby had a solids content of 46 percent, contained microspheres largely in the range of six to nine microns, and did not show any evidence of settling or creaming when stored for two months. Similar advantageous products are obtained when styrene, or the various isomeric dimethyl styrenes such as 2,4-dimethyl styrene, 2,5-dimethyl styrene and 3,4-dimethyl styrene are substituted for the vinyl toluene of the above example. When the divinyl benzene of the above examples is omitted, an aqueous dispersion containing polymer microspheres which are slightly softer are obtained; nevertheless, the aqueous dispersions are stable for extended periods, especially showing little evidence of settling or creaming of the polymeric particles.

That which is claimed is:

1. An aqueous dispersion of polymeric microspheres having an average diameter of from about 3 microns to about 40 microns having a reduced tendency to creaming or settling, said polymeric microspheres consisting essentially of the polymerization product of from about 65 percent to about 85 percent by weight of monomeric constituents having dissolved therein from about 15 percent to about 35 percent by weight of a wax having a specific gravity of less than about 0.95 and consisting essentially of hydrocarbon substances, said monomeric constituents consisting of at least 80 percent by weight of a monomer having the formula

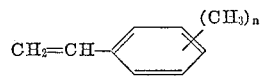

where $n$ is a cardinal number from 0 to 2, and the balance of the monomeric constituents consisting of emulsion-polymerizable hydrocarbon monomers; and said polymeric microspheres having about the same density as the aqueous portion of the dispersion.

2. The aqueous dispersion of claim 1 in which the monomeric constituent is vinyl toluene.

3. The aqueous dispersion of claim 1 in which the monomeric constituents include a small amount of divinylbenzene.

4. The aqueous dispersion of claim 1 in which the wax is paraffin wax.

5. An aqueous dispersion having a reduced tendency to creaming or settling consisting essentially of polymeric microspheres having a diameter largely in the range of six to nine microns, each of said polymeric microspheres consisting essentially of from about 15 percent to about 35 percent by weight of paraffin wax, and from about 65 percent to about 85 percent by weight of a synthetic polymer consisting of (a) the polymerization product of at least 80 percent of a monomer having the formula

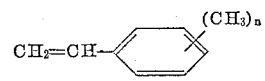

where $n$ is a cardinal number from 0 to 2 and (b) 0 to about 20 percent of copolymerizable ethylenic hydrocarbon monomers; and said polymeric microspheres having about the same density as the aqueous portion of the dispersion.

6. A process for preparing an aqueous dispersion of polymeric microspheres having an average diameter of from about 3 microns to about 40 microns and having a reduced tendency to creaming or settling by the steps of (1) preparing a solution of from about 15 percent to about 35 percent by weight of a wax having a specific gravity less than about 0.95 in from about 65 percent to about 85 percent by weight of a monomer composition consisting essentially of (a) at least 80 percent by weight of a monomer having the formula

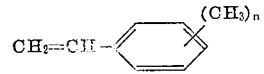

where $n$ is a cardinal number from 0 to 2; and (b) from 0 to about 20 percent of polymerizable ethylenic hydrocarbon monomers;

(2) preparing a dispersion of the resulting solution by mixing the solution with water, colloidal silica and a water-soluble protein; and (3) heating and agitating the resulting dispersion with a free-radial catalyst until polymerization is substantially complete.

7. The aqueous dispersion of claim 1 which contains colloidal silica and a water-soluble protein.

8. The aqueous dispersion of claim 5 which contains colloidal silica and a water-soluble protein.

9. The process of claim 6 in which the colloidal silica and the water-soluble protein are used in combined amount of from about 0.1 percent to about 10 percent, based on the total weight of the aqueous dispersion.

No references cited.

MORRIS LIEBMAN, *Primary Examiner.*

H. S. KAPLAN, *Assistant Examiner.*